G. P. BRYANT.
Bustles.

No. 129,883.

Patented July 30, 1872.

Witnesses
S. N. Piper
J. R. Snow

George P. Bryant
by his attorney
R. H. Eddy

UNITED STATES PATENT OFFICE.

GEORGE P. BRYANT, OF BOSTON, MASSACHUSETTS.

IMPROVEMENT IN BUSTLES.

Specification forming part of Letters Patent No. 129,883, dated July 30, 1872.

*To all persons to whom these presents may come:*

Be it known that I, GEORGE P. BRYANT, of Boston, in the county of Suffolk and State of Massachusetts, have invented a new and useful Improvement in Bustles; and do hereby declare the same to be fully described in the following specification and represented in the accompanying drawing, of which—

Figure 1:
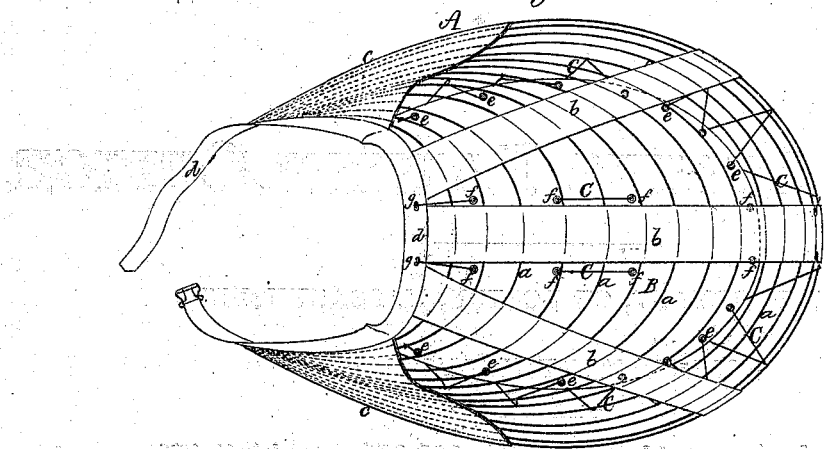
Figure 2:
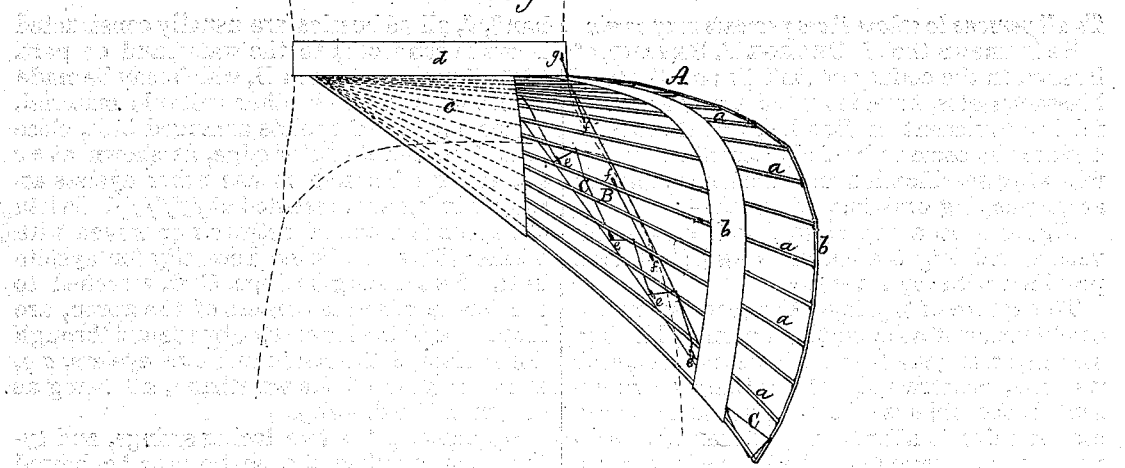
Figure 3:
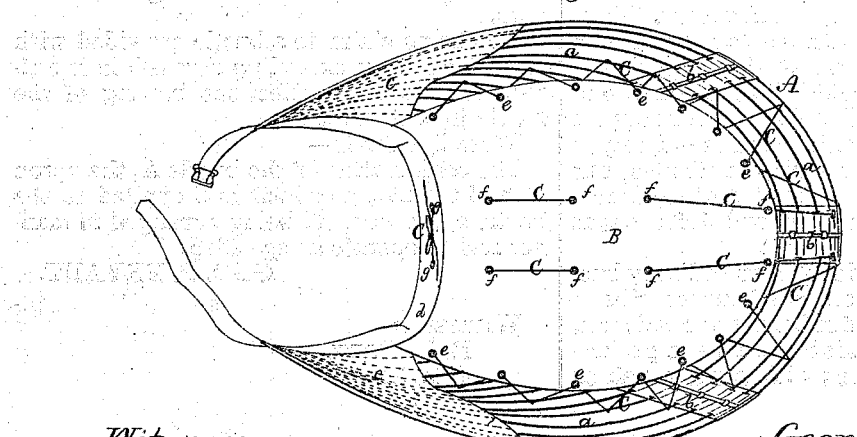

Figure 1 is a top view, Fig. 2 a side elevation, and Fig. 3 a bottom view of a bustle provided with my invention.

The nature of my invention consists in the combination of a supporting-apron and lacing-strings, arranged as hereinafter explained, with a bustle, constructed substantially as represented, the objects of the apron and lacing-strings being to afford a proper bearing or support for the bustle upon the back of a woman, and to effect the proper curving of the bustle by longitudinal and lateral draft upon it. When a bustle is furnished with crowning straps or strings arranged only across the middle of it from the back of its waistband to the crown of the lowermost rib, such affords a poor support for the bustle, and besides can be used only to crown it in one direction—viz., lengthwise; but my improvement enables the bustle to be drawn in or let out both lengthwise and widthwise at once.

In the drawing, A denotes an ordinary bustle, constructed of a series of curved ribs or bows, $a\,a\,a\,a$, arranged in bonnet or hood form, and connected by bands $b\,b\,b$ and end pocket-pieces $c\,c$, and provided with a waist belt or band, $d$, all as bustles are usually constructed. There is connected to the waistband or part of the bustle the apron B, which may be made of net-work cloth or other suitable material. It has a series of eyelets arranged in it, close to and around its outer edge, as shown at $e\,e\,e\,e$, and furthermore it has other eyelets arranged in it, as represented at $f\,f\,f\,f\,f\,f$. When the apron is made of net-work or woven with meshes there will be no necessity for eyelets in it. Two lacing-strings, C C, attached to the bustle near the corners of the apron, are laced around the bows of the bustle and through the eyelets of the apron and two eyelets, $g\,g$, at the middle of the waistband, all being as shown in the drawing.

By drawing the two lacing-strings, and tying them together, the bustle may be bowed both lengthwise and widthwise to great advantage.

I make no claim to a bustle provided with straps or strings extending across it in one direction only, and to effect the bowing of the bustle in such direction.

What I claim is—

The combination of the bustle A, the apron B, and the lacing or lacings C applied to the bustle and apron, all being arranged in manner and to operate as specified.

GEO. P. BRYANT.

Witnesses:
R. H. EDDY,
J. R. SNOW.